United States Patent
Lin

(10) Patent No.: US 8,244,132 B2
(45) Date of Patent: Aug. 14, 2012

(54) PRE-COMPENSATION METHOD FOR DELAYS CAUSED BY OPTICAL FIBER CHROMATIC DISPERSION, MULTI-SUB-CARRIER SIGNAL GENERATOR APPLYING THE METHOD, AND TRANSMITTER OF OPTICAL-OFDM SYSTEM APPLYING THE SIGNAL GENERATOR

(75) Inventor: Yu-Min Lin, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 600 days.

(21) Appl. No.: 12/501,677

(22) Filed: Jul. 13, 2009

(65) Prior Publication Data

US 2010/0284695 A1 Nov. 11, 2010

(30) Foreign Application Priority Data

May 6, 2009 (TW) ................................ 98115056 A

(51) Int. Cl.
 *H04J 14/02* (2006.01)
 *H04K 1/10* (2006.01)
 *H04L 27/28* (2006.01)
(52) U.S. Cl. ........................... 398/81; 398/79; 375/260
(58) Field of Classification Search .................... 398/81, 398/147
 See application file for complete search history.

(56) References Cited

U.S. PATENT DOCUMENTS

| 5,682,376 A | 10/1997 | Hayashino et al. |
| 7,023,929 B2 | 4/2006 | Mujica et al. |
| 7,693,429 B1 * | 4/2010 | Lowery .......................... 398/192 |
| 2003/0169682 A1 * | 9/2003 | Chen et al. ..................... 370/206 |
| 2007/0183310 A1 * | 8/2007 | Nakamura ..................... 370/208 |
| 2009/0135925 A1 * | 5/2009 | Hamaguchi et al. .......... 375/260 |
| 2010/0226458 A1 * | 9/2010 | Dent et al. ..................... 375/296 |
| 2010/0247099 A1 * | 9/2010 | Lowery et al. .................. 398/79 |

OTHER PUBLICATIONS

Jansen, Sander L., et al., Coherent Optical 25.8-Gb/s OFDM Transmission Over 4160-km SSMF, J. of Lightwave Tech., vol. 26, No. 1, Jan. 1, 2008.
Shieh, W. et al., "Coherent Optical Orthogonal Frequency Division Multiplexing," Electronic Letters, vol. 42, No. 10, May 11, 2006.

(Continued)

*Primary Examiner* — Kenneth N Vanderpuye
*Assistant Examiner* — Abbas H Alagheband
(74) *Attorney, Agent, or Firm* — Morris, Manning & Martin, LLP; Tim Tingkang Xia, Esq.

(57) ABSTRACT

A pre-compensation method for delays caused by optical fiber chromatic dispersion, a multi-sub-carrier signal generator applying the method, and a transmitter applying the signal generator are applicable to an optical orthogonal frequency-division multiplexing (OFDM) system. The pre-compensation method includes receiving a plurality of pre-compensation values, in which the pre-compensation values correspond to sub-carriers; and transmitting the sub-carriers after delaying the sub-carriers by time of the corresponding pre-compensation values. The delay time between the sub-carriers is estimated at a receiver end and a pre-compensation value of the transmitter is set according to the delay time. The transmitter delays the pre-compensation values respectively when transmitting the respective sub-carriers. Therefore, the respective sub-carriers are able to reach a receiver at nearly the same time, thereby achieving a purpose of pre-compensating for the delays caused by optical fiber chromatic dispersion.

8 Claims, 9 Drawing Sheets

OTHER PUBLICATIONS

Savory, Seb J., "Digital Signal Processing Options in Long Haul Transmission," Optical Network Group, Dept of Electronic Engineering, Univ. College of London, 2008.

Shieh, W. et al., "Experimental Demonstration of Transmission of Coherent Optical OFDM Systems," ARC Special Research Center for Ultra-Broadband Information Networks and National ICT Australia Dept of Electrical and Electronics Engineering, University of Melbourne, 2007.

Schmidt, Brendon J.C. et al, "Experimental Demonstrations of Electronic Dispersion Compensation for Long-Haul Transmission Using Direct-Detection Optical OFDM," J. of Lightwave Tech., vol. 26, No. 1, Jan. 1, 2008.

Lowery, Arthur James, et al., "Orthogonal-Frequency-Division Multiplexing for Optical Dispersion Compensation," Dept. of Electrical and Computer Systems Engineering, Monash University, 2007.

* cited by examiner

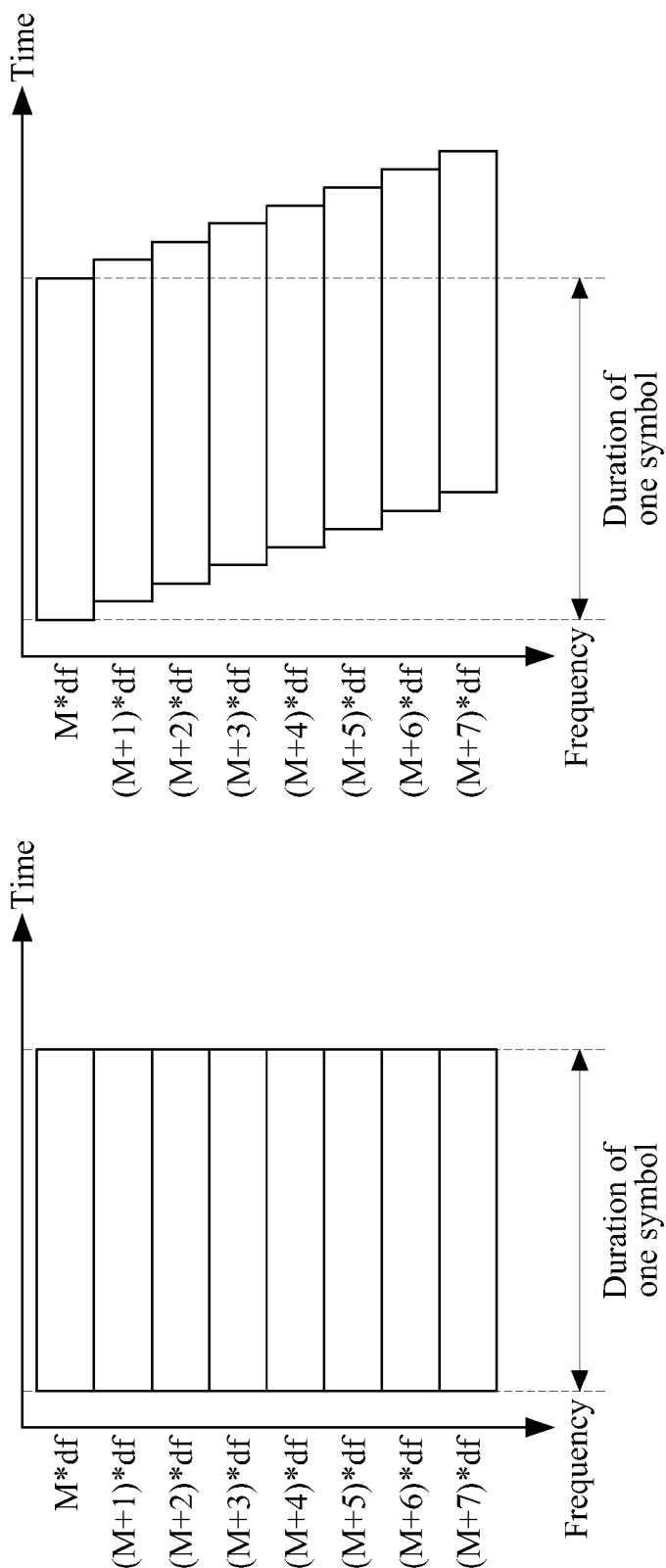

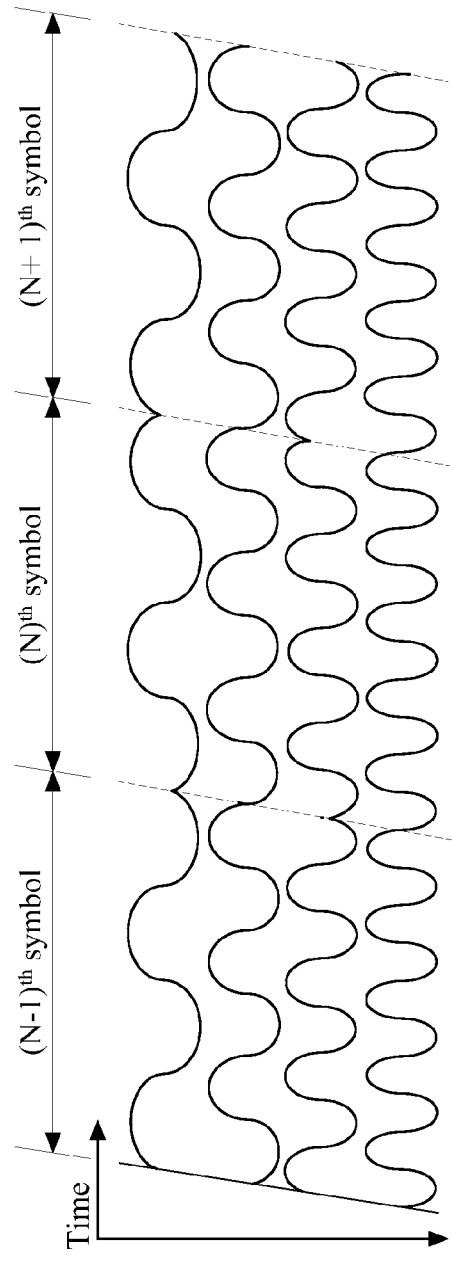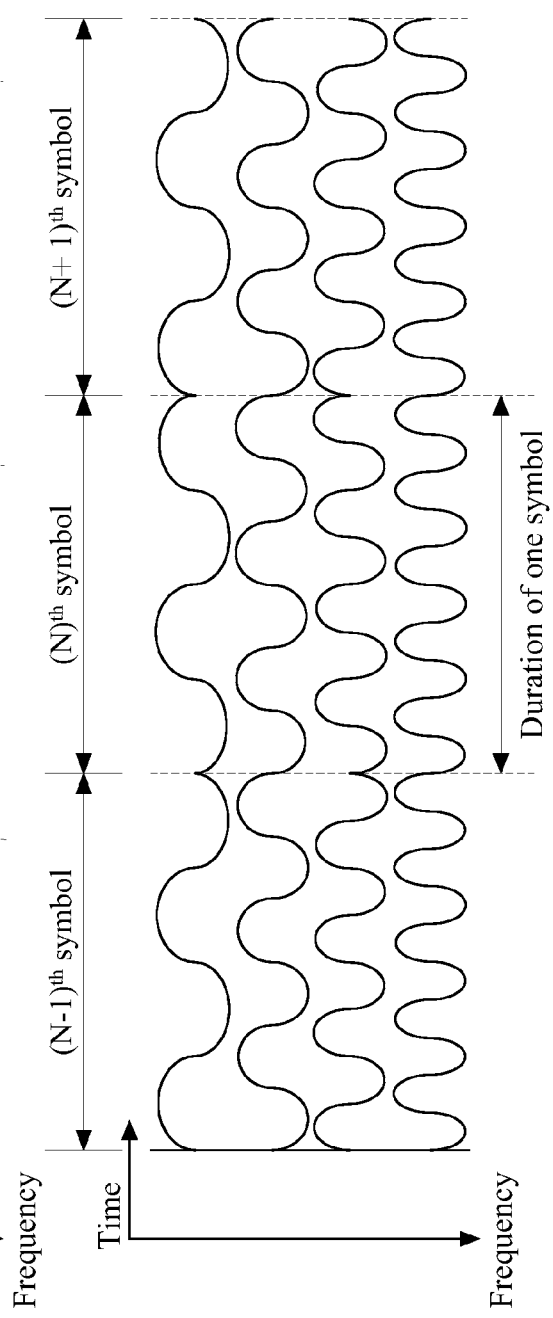
FIG.5A
FIG.5B

PRE-COMPENSATION METHOD FOR DELAYS CAUSED BY OPTICAL FIBER CHROMATIC DISPERSION, MULTI-SUB-CARRIER SIGNAL GENERATOR APPLYING THE METHOD, AND TRANSMITTER OF OPTICAL-OFDM SYSTEM APPLYING THE SIGNAL GENERATOR

CROSS-REFERENCE TO RELATED APPLICATIONS

This non-provisional application claims priority under 35 U.S.C. §119(a) on Patent Application No(s). 098115056 filed in Taiwan, R.O.C. on May 6, 2009 the entire contents of which are hereby incorporated by reference.

BACKGROUND OF THE INVENTION

1. Field

The present invention relates to a transmitter capable of pre-compensating for delays caused by optical fiber chromatic dispersion in a system utilizing an optical orthogonal frequency-division multiplexing (OFDM) technology.

2. Related Art

An orthogonal frequency-division multiplexing (OFDM) system is an FDM system utilizing a digital multi-carrier modulation method. A plurality of orthogonal sub-carriers (also referred to as sub-bands) is used to transmit data. The data is cut into several parallel data streams (or referred to as channels) corresponding to the respective sub-carriers. For each sub-carrier, data transmission is performed with an orthogonal modulation technology with a relatively low symbol rate. In such a manner, compared with a conventional single-carrier, a higher total data rate may be obtained within the same bandwidth.

FIGS. 1A and 1B are schematic views of spectrum distribution comparison of conventional direct transmission and OFDM transmission respectively. The greatest difference between the direct transmission and the OFDM transmission is bandwidth distribution. FIG. 1A shows that bandwidth occupied by the direct transmission is $f_0$. If the bandwidth $f_0$ is subdivided into five equal parts with equal widths in an OFDM manner, and respective sub-bands (that is, the sub-carriers) are orthogonal to one another, new spectrum distribution will be as shown in FIG. 1B. In the OFDM transmission, as long as the sub-bands are enough, basically, frequency response of the band may be approximately considered flat for every sub-band. That is to say, only one equalizer with a single coefficient is needed for each sub-band to overcome attenuation and phase distortion of each sub-channel. In addition, as a data rate of transmission of each sub-band is much lower than the data rate of original direct transmission, and operation clock of the equalizer is surely decreased in equal proportion.

For application of OFDM technology in a field of wireless communication, a common problem is a multi-path effect. The multi-path effect will result in time-spreading and inter-symbol interference (ISI) problem. This is the so-called frequency-selective channel. This frequency-selective problem is usually solved by adding a guard interval into a symbol of each OFDM. This approach will increase a symbol period, and occupy the bandwidth for data transmission.

When the OFDM technology is applied in an optical communication system, as light rays are transmitted in the same optical fiber, the multi-path effect of an optical-OFDM system is not significant. However, due to a phenomenon of optical fiber chromatic dispersion, when a receiving end receives signals, a problem of inter-channel synchronization and an ISI problem similar to the multi-path will occur.

The optical fiber chromatic dispersion causes that a transmission speed of optical signals with higher frequencies is lower than a transmission speed of optical signals with lower frequencies when the optical signals are transmitted through the optical fiber. In the optical-OFDM technology, as each sub-carrier is transmitted at a different frequency, although a transmitter transmits the respective sub-carriers at the same time, the respective sub-carriers received at the receiving end reach at different time. This is the so-called group delay phenomenon.

The details of the group delay phenomenon may be obtained with reference to FIGS. 2A and 2B, and FIGS. 2A and 2B are schematic views of signals transmitted and received at a transmitting end and a receiving end of an optical-OFDM system respectively. FIGS. 2A and 2B are schematic views showing an OFDM signal in a frequency domain. In the drawings, a horizontal axis indicates time, and a vertical axis indicates frequency. Each sub-carrier (sub-band) uses one band. Taking FIG. 2A as an example, each sub-carrier uses a bandwidth of df in the figure. A band (frequency band) of a first sub-carrier is M*df, and the next is (M+1)*df, and the rest may be deduced through analog. It is shown in the figures that each sub-carrier only has data of one symbol. In practical transmission, consecutive symbols are transmitted and received. FIG. 2A is a schematic view of symbols transmitted at the transmitting end. It can be seen from the figure that respective symbols at the transmitting end have the same initial time. As the respective symbols have the same durations, the symbols at the transmitting end also have the same end time. Next, FIG. 2B is a schematic view of signals received at the receiving end after the OFDM signal is transmitted through an optical fiber. It can be seen from the figure that the sub-carriers with lower frequencies (that is, the sub-carriers at the upper part of the frequency axis) are received earlier, while the sub-carriers with higher frequencies (that is, the sub-carriers at the lower part of the frequency axis) reach later. This is the so-called group delay's variation/dispersion.

In order to solve the group delay's variation problem, those in the art add a guard interval into each symbol of a sub-carrier. The guard interval may be a cyclic prefix or a cyclic postfix, and the like. By setting the guard interval, when the receiving end extracts data within the same time interval (that is, the original symbol length added with the guard interval duration), data of each sub-carrier will be complete. Decoding may be performed only upon determining the starting point.

Although the guard interval may solve the group delay's variation problem caused by the optical fiber chromatic dispersion, the more sever optical fiber chromatic dispersion may result in longer guard interval to be added. However, the longer guard interval occupies more bandwidth. That is to say, the bandwidth that can be used to transmit data is reduced. The group delay generated by the chromatic dispersion is in direct proportion to a transmission distance in the optical fiber and a frequency difference between sub-carriers. That is to say, the larger total bandwidth or the longer transmission distance results in the greater group delay's variation, and thus the longer guard interval is required to solve the problem.

An essay on application of the OFDM technology in a field of optical communication is one published by W. Shieh, X. Yi and Y Tang (referring to "Experimental Demonstration of Transmission of Coherent Optical-OFDM Systems", Optical Fiber Communications Conference (OFC) 07, OMP2, March, 2007). The assay discloses experimental demonstration of a coherent optical-OFDM system. A situation that 128 OFDM sub-carriers using a transmission speed of 8 Gb/s ($8\times10^9$ bits/second) are transmitted and received through an optical fiber of 1000 kilometers (km) is shown. In the essay, problems generated by optical fiber chromatic dispersion are overcome in the manner of guard intervals.

Usually the guard interval added due to the optical fiber chromatic dispersion occupies at least 6% of the communication bandwidth. If the bandwidth occupied to serve as pilot carriers (scatter pilot, preamble or mid-amble) for channel response estimation and the bandwidth of control signals are subtracted from the communication bandwidth, the bandwidth for data transmission will be further reduced.

SUMMARY

In view of the phenomenon that guard intervals need to be increased with increasing transmission distance, thus occupying the communication bandwidth, the present invention is a pre-compensation method for delays caused by optical fiber chromatic dispersion, a multi-sub-carrier signal generator applying the method, and a transmitter of a optical-orthogonal frequency-division multiplexing (OFDM) system applying the signal generator, thereby decreasing guard intervals effectively, and increasing bandwidth available to transmit data.

The pre-compensation method for delays caused by optical fiber chromatic dispersion provided in the present invention is applicable to an optical-OFDM transmitter. The transmitter transmits an optical signal having a plurality of sub-carriers. Each sub-carrier has a carrier frequency, and the carrier frequencies of the sub-carriers are different. The method comprises: receiving a plurality of pre-compensation values corresponding to the sub-carriers; delaying the sub-carriers for times of the corresponding pre-compensation values and transmitting the delayed sub-carriers.

The multi-sub-carrier signal generator proposed in the present invention is applicable to a transmitter of an optical-OFDM system. A serial to parallel converter of the transmitter converts and maps a digital sequence signal into a plurality of parallel signals. The generator comprises a plurality of time domain modulated waveform generators, a plurality of guard interval adding elements, a plurality of delay units, and an adder. The time domain modulated waveform generators correspond to the parallel signals in a one-to-one relation. Each of the time domain modulated waveform generators generates a time domain signal according to the corresponding parallel signal. The guard interval adding elements correspond to the time domain modulated waveform generators in a one-to-one relation. Each guard interval adding element adds a guard interval to the time domain signal generated by the corresponding time domain modulated waveform generator to form an GI-added signal. The delay units correspond to the guard interval adding elements in a one-to-one relation. Each of the delay units has a predetermined delay value. Each of the delay units transmits the GI-added signal generated by the corresponding guard interval adding element after delaying the GI-added signal for the predetermined delay value. The adder merges the GI-added signals transmitted by the delay units to output a merged signal.

The transmitter of the optical-OFDM system provided in the present invention converts a digital sequence signal into an optical signal and transmits the optical signal. The transmitter comprises a serial to parallel converter, a multi-sub-carrier signal generator, a digital to analog converter, and an electrical to optical converter. The serial to parallel converter converts and maps the digital sequence signal into a plurality of parallel signals. The multi-sub-carrier signal generator generates a plurality of corresponding time domain signals according to the parallel signals. The multi-sub-carrier signal generator further delays the time domain signals according to a plurality of predetermined delay values corresponding to the parallel signals, and then merges the delayed time domain signals into a merged signal. The digital to analog converter converts the merged signal into an analog signal. The electrical to optical converter converts the analog signal into an optical signal.

Through the pre-compensation method, the multi-sub-carrier signal generator, and the optical-OFDM transmitter proposed in the present invention, delays caused by chromatic dispersion may be suitably pre-compensated for at the transmitter end, and every sub-carrier may reach the receiving end at substantially the same time after optical fiber transmission.

Features, implementations and effects related to the present invention are illustrated in detail in the following with reference to the accompanying drawings as the most preferred embodiment.

The illustration of the content of the present invention above and the following detailed description are only used to exemplify and explain the spirit and principle of the present invention, and to provide a further explanation for the claims of the present invention.

BRIEF DESCRIPTION OF THE DRAWINGS

The present invention will become more fully understood from the detailed description given herein below for illustration only, and thus are not limitative of the present invention, and wherein:

FIGS. 2A and 2B are schematic views of signals transmitted and received at a transmitting end and a receiving end of a conventional optical-OFDM system respectively;

FIG. 5A is a schematic view of frequency domain of delayed time domain signals transmitted by respective delay units in a transmitter according to an embodiment of the present invention;

FIG. 5B is a schematic view of frequency domain of the delayed time domain signals in FIG. 5A received by the receiver;

DETAILED DESCRIPTION

Figures 1A, 1B:
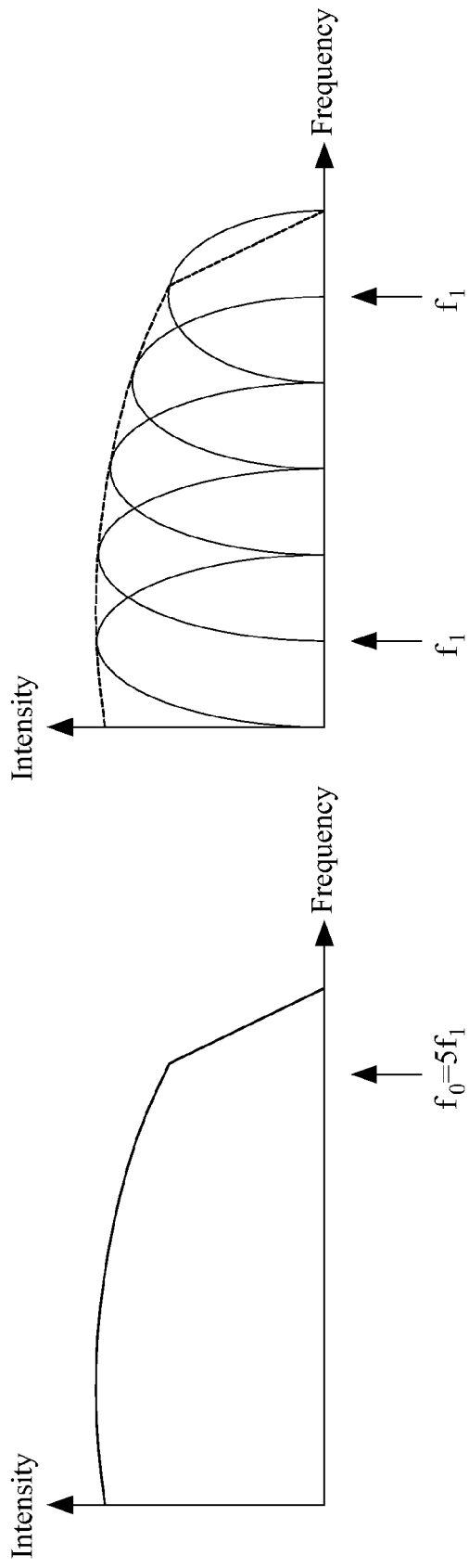
FIGS. 1A and 1B are schematic views of comparison of spectrum distribution between conventional direct transmission and orthogonal frequency-division multiplexing (OFDM) transmission.
Figure 3:
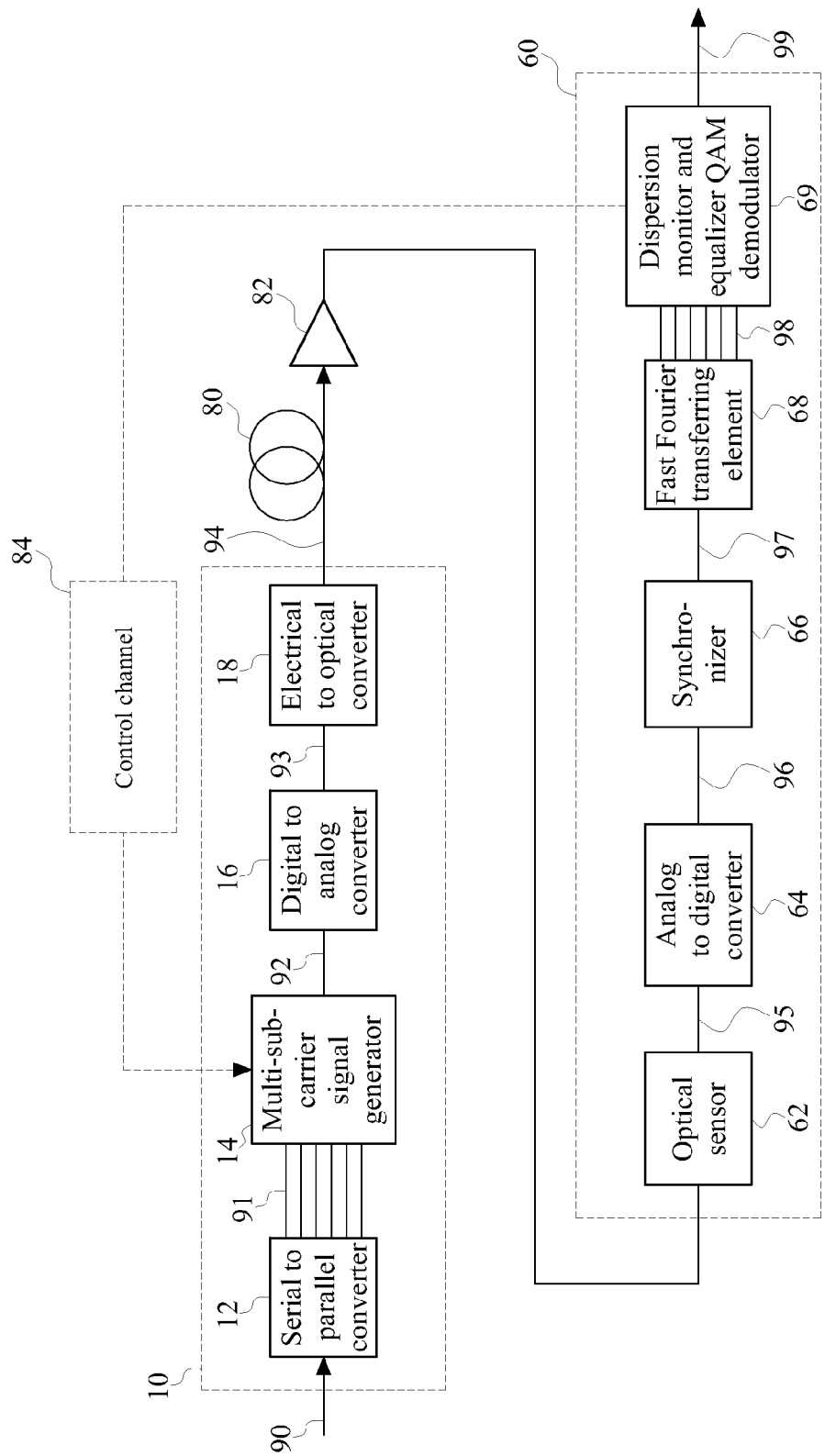
FIG. 3 is a schematic view of system architecture of a transmitter and a receiver of an optical orthogonal multiplexing system according to an embodiment of the present invention.

First, FIG. 3 is a schematic view of system architecture of a transmitter 10 and a receiver 60 of an optical orthogonal multiplexing system according to an embodiment of the present invention. As can be seen in the figure, the transmitter 10 converts a digital sequence signal 90 into an optical signal 94 and transmits the optical signal 94. This optical signal 94 is transmitted by an optical fiber 80 and amplified by an optical amplifier 82, and then received by the receiver 60.

The optical signal 94 is an orthogonal frequency-division multiplexing (OFDM) optical signal 94. The optical amplifier 82 may be, but not limited to, erbium-doped optical fiber amplifier. The optical 80 fiber is, but not limited to, a single mode fiber.

After receiving the optical signal 94, the receiver 60 estimates a total delay time of a group delay generated by the chromatic dispersion of the optical signal 94, and then returns the total delay time to the transmitter 10. The total delay time may be returned to the transmitter 10 through a control channel 84 for communication between the transmitter 10 and the receiver 60. Alternatively, the total delay time may be returned to the transmitter 10 in other manners. Although the control channel 84 is indicated in the figure in a manner different from the optical fiber 80, the control channel 84 may be actually one channel in the optical fiber communication. Moreover, a manner of manual setting may also be used. For example, after the total delay time of the group delay is measured or estimated at the receiver 60, the total delay time is manually set at the transmitter 10.

The transmitter 10 comprises a serial to parallel converter 12, a multi-sub-carrier signal generator 14, a digital to analog converter 16, and an electrical to optical converter 18. The serial to parallel converter 12 converts and maps the digital sequence signal 90 into a plurality of parallel signals 91. The total delay time is converted into a plurality of predetermined delay values. Each of the predetermined delay values corresponds to the parallel signal respectively. How the total delay time is converted into the predetermined delay values will be described in detail below.

Figure 4:
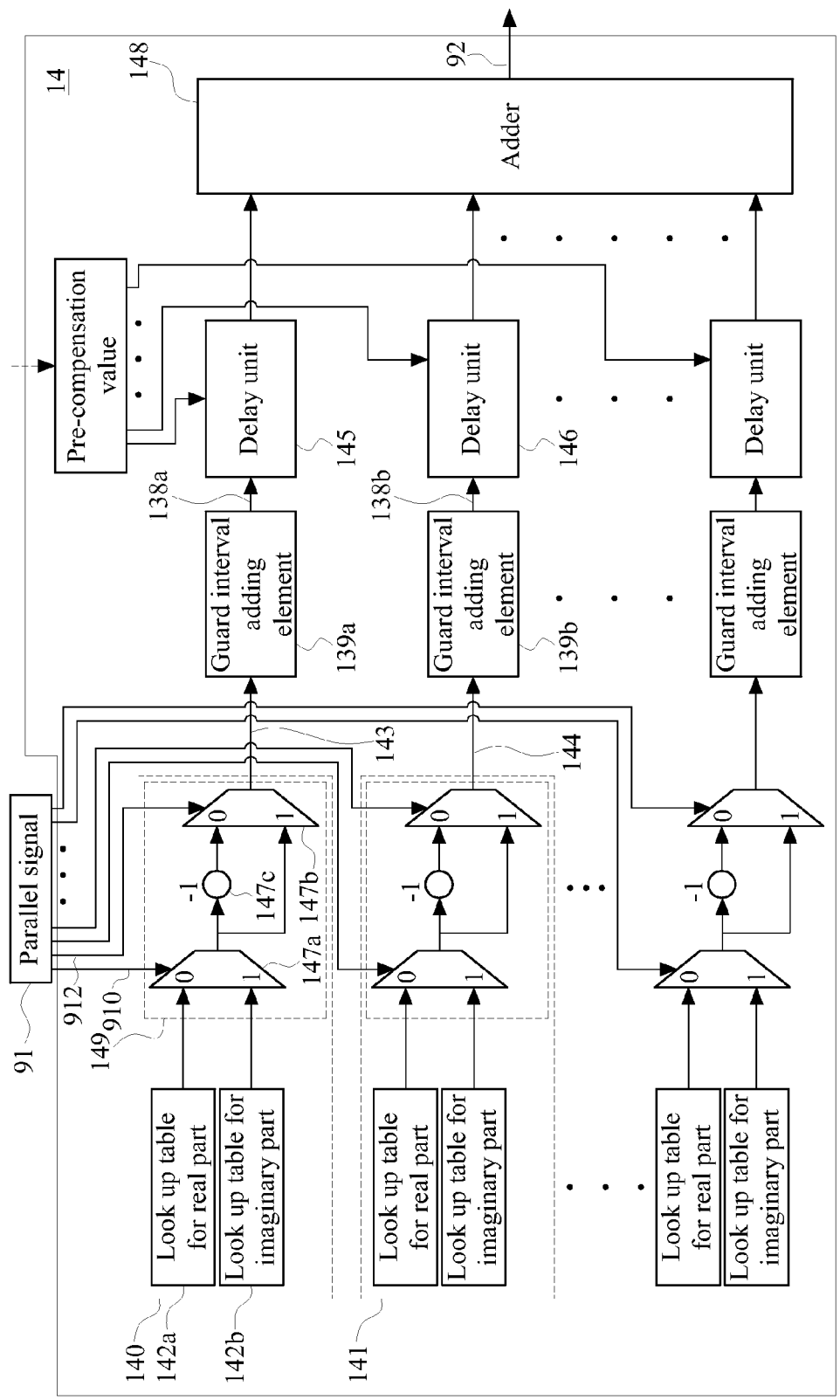
FIG. 4 is a schematic circuit block diagram of a multi-sub-carrier signal generator in a transmitter in an optical-OFDM system according to an embodiment of the present invention.

The multi-sub-carrier signal generator 14 generates a plurality of time domain signals 143, 144 corresponding to respective sub-carriers according to the parallel signals 91 (see FIG. 4). The multi-sub-carrier signal generator 14 further delays the time domain signals 143, 144 according to a plurality of predetermined delay values (or referred to as precompensation values) corresponding to the parallel signals 91, and merges the delayed time domain signals 143, 144 into a merged signal 92. The digital to analog converter 16 converts the merged signal 92 into an analog signal 93. The electrical to optical converter 18 converts the analog signal 93 into the optical signal 94. The electrical to optical converter 18 may be, but not limited to, a laser (or a directly-modulated laser (DML)).

The serial to parallel converter 12 first cuts the digital sequence signal 90 to be transmitted into several parallel data streams. Each parallel data stream is then converted to the parallel signal 91 with a modulation technology having relatively a low symbol rate. The modulation technology may be, but not limited to, orthogonal amplitude modulation (QAM) or phase shift keying (PSK).

The multi-sub-carrier signal generator 14 delays an initial time that each of the time domain signals 143, 144 is sent according to the predetermined delay value of the parallel signal 91. The architecture of the multi-sub-carrier signal generator 14 may be obtained with reference to FIG. 4. FIG. 4 is a schematic circuit block diagram of a multi-sub-carrier signal generator 14 in the transmitter 10 in an optical-OFDM system according to an embodiment of the present invention.

As can be seen from the figure, the multi-sub-carrier signal generator 14 comprises a plurality of time domain modulated waveform generators 140, 141, a plurality of guard interval adding elements 139a, 139b, a plurality of delay units 145, 146, and an adder 148. The time domain modulated waveform generators 140, 141 correspond to the parallel signals 91 in a one-to-one relation. The time domain modulated waveform generators 140, 141 convert the parallel signals 91 in the frequency domain into time domain signals 143, 144 in the time domain. Subsequently, the guard interval adding elements 139a, 139b correspond to the time domain modulated waveform generators 140, 141 and the delay units 145, 146 in a corresponding relation. The guard interval adding elements 139a, 139b add guard intervals to the time domain signals 143, 144 to form GI-added signals 138a, 138b. Each of the delay units 145, 146 transmits the GI-added signals 138a and 138b generated by the corresponding guard interval adding element 139a and 139b after delaying the GI-added signals 138a and 138b for the predetermined delay value. In such a manner, although each of the parallel signals 91 is received by the multi-sub-carrier signal generator 14 at the same time, after adjustment of the multi-sub-carrier signal generator 14, the delay unit 145 and 146 delay the GI-added signals 138a and 138b for times corresponding to the predetermined delay values, and transmit the delayed GI-added signals 138a and 138b. The adder 148 merges the GI-added signals 138a and 138b transmitted by the delay units 145 and 146, and outputs the merged signal 92.

The delay units 145, 146 is a digital delay unit, which may be, but not limited to, a variable digital delay, a first-in-first-out (FIFO)-based variable digital delay.

The objective and calculation of the group delay and the predetermined delay values may be obtained with reference to FIG. 2A again. As can be seen from the experiment, when a frequency difference value between respective sub-carriers (groups) is a fixed value (that is, a difference of df bandwidth as shown in the figure), and under the condition that transmission environment for the optical signal 94 is not changed, the group delay is linear. Example 1 is proposed below for illustration. It is assumed that the OFDM signal in Example 1 comprises 8 sub-carriers. A total delay time (caused by chromatic dispersion) between a first sub-carrier and a last sub-carrier that the receiver 60 receives is 0.7 ns ($1 \times 10^{-9}$ second). Under such a condition, a group delay between respective sub-carriers is 700 ps ($1 \times 10^{-12}$ seconds) divided by (8−1) (because of seven carrier intervals in total), i.e., 100 ps. That is to say, although the sub-carriers (groups) are transmitted at the same time, adjacent sub-carriers (groups) are received sequentially at an interval of 100 ps, as shown in FIG. 2B.

In order to solve the problem, in the embodiment of the present invention, before the transmitter 10 transmits the optical signal 94, each sub-carrier is compensated for according to its predetermined delay time, such that each sub-carrier (group) is transmitted according to the predetermined delay time. The sub-carriers with adjacent frequencies are transmitted sequentially. A time pitch of such sequential transmission equals to a group delay difference between the sub-carriers (following the above Example 1, that is, 100 ps). Thereby, the receiver 60 receives the sub-carriers reached at nearly the same time. The problem of group delay is thus solved.

Due to the chromatic dispersion, transmission speed of the optical signals 94 having higher frequencies in the optical fiber 80 is lower than that of the optical signals 94 having lower frequencies. Therefore, sub-carriers having higher frequencies are transmitted first. That is to say, the sub-carriers having higher frequencies are transmitted earlier. FIG. 5A is a schematic view of frequency domain of the delayed time domain signals 143, 144 transmitted from respective delay units 145, 146 in the transmitter 10 according to the present invention. In the figure, the horizontal axis indicates time, and the vertical axis indicates frequency. For the vertical axis, the lower in the figure a part is, the higher the frequency is. In FIG. 5A, four sub-carriers are taken as an example. As can be seen from the figure, the sub-carriers with higher frequencies are transmitted earlier. The sub-carriers with lower frequencies are transmitted later. A unit delay time exists between adjacent sub-carriers.

The unit delay time is preferably an integral multiple of a unit sampling time. Following the Example 1, it is assumed that the unit sampling time is 40 ps (equal to a sampling rate of 25 GHz). Each sampling point is referred to as one point number. The unit sampling time (40 ps) exists between adjacent sampling points. The first sub-carrier has the lowest frequency, and the transmission speed thereof is the highest. The eighth sub-carrier has the highest carrier frequency, and the transmission speed thereof is the lowest. Frequency bandwidths between the respective sub-carriers are the same (that is, the frequency difference values are the same). Thus, the delay times of pre-compensation at the transmitting end 10 according to delay differences between the respective sub-carriers received before the compensation are as shown in the following table (a unit delay point number of Example 1 is equal to the unit sampling time, that is, 40 ps). In the following table, the column "Delay time Received before Compensation" means a delay time obtained by comparing a time that each sub-carrier is received and a time that the first sub-carrier is received when the transmitter 10 transmits the respective sub-carriers at the same time, and the receiver 60 receives the respective sub-carriers. Taking Table 1 as an example, the first sub-carrier is received first, and the rest are received sequentially. Thus, the column shows delay times obtained by comparison between other sub-carriers and the first sub-carrier.

| Sub-carrier Number | Delay time Received Before Compensation | Predetermined Delay value (Pre-compensation Value) | Delay Point Number (Pre-compensation) |
|---|---|---|---|
| First Sub-carrier | 0 ps | 720 ps | 18 points |
| Second Sub-carrier | 100 ps | 600 ps | 15 points |
| Third Sub-carrier | 200 ps | 520 ps | 13 points |
| Fourth Sub-carrier | 300 ps | 400 ps | 10 points |
| Fifth Sub-carrier | 400 ps | 320 ps | 8 points |
| Sixth Sub-carrier | 500 ps | 200 ps | 5 points |
| Seventh Sub-carrier | 600 ps | 120 ps | 3 points |
| Eighth Sub-carrier | 700 ps | 0 ps | 0 points |

As can be seen from the table above, the pre-compensation values of the second, fourth, sixth, and eighth sub-carriers are respectively set as a time difference between the time of the sub-carrier reaching the receiver 60 and the time of the eighth sub-carrier (the eighth sub-carrier is a sub-carrier having the highest carrier frequency) reaching the receiver 60. For the first, third, fifth, and seventh sub-carriers, because their "time differences between sub-carriers" are unable to be divided exactly by the unit sampling time, a multiple of the unit sampling time closest to the time difference between the sub-carriers is set as a time difference. For example, although a time difference between the first sub-carrier and the eighth sub-carrier is 700 ps, as it is unable to be divided exactly by the unit sampling time, 720 ps is used as a delay time for delaying transmission. Of course, 680 ps may also be used as the delay time. The rest may be deduced through analog.

As can be seen from the example in the table above, the second, fourth, sixth, and eighth sub-carriers will be received by the receiver 60 at the same time, and the first, third, fifth, and seventh sub-carriers will be received 20 ps later. As such, the guard interval may be decreased from 700 ps that the technology of the present invention is not used to 40 ps that the present invention is used (because 20 ps does not reach 1 sampling point, and the receiver 60 performs decoding in the sampling point, 20 ps is also counted as 1 sampling point). The bandwidth occupied by the guard intervals is greatly reduced. If in Example 1 each symbol is 128 points (that is, the duration of 128×40 ps=5120 ps), the conventional guard interval delay is 18 points. The conventional guard interval occupies the bandwidth of 12.8% (18/(18+128)=12.8%) of the sum of the symbol and the guard interval. If the technology of the present invention is used in Example 1, the guard interval of the present invention only occupies 0.8% (1/(1+128)=0.77%) of the total bandwidth.

As can be seen form the pre-compensation values and the carrier frequencies of the respective sub-carriers, the pre-compensation values of the sub-carriers having higher carrier frequencies are less than the pre-compensation values of the sub-carriers having lower carrier frequencies.

In the Example 1, the pre-compensation values of respective sub-carriers are different. However, during the practical application, the situation is not limited thereto. If delay reaching times between three sub-carriers are less than one sampling point number (time), the delay point numbers of the three sub-carriers will be the same.

In addition, following the illustration of FIG. 5A, after the delayed time domain signals 143, 144 are merged and transmitted through the optical signal 94, the optical signals 94 reaches the receiver 60 through the optical fiber 80. Fast Fourier conversion is performed on the signals received by the receiver 60 (which will be described in detail in the following). FIG. 5B is a schematic view of frequency domain of the converted signals. As can be seen from the figure, because the transmitter 10 has pre-compensated for the delays caused by chromatic dispersion before transmission, respective sub-carriers of the received signal as shown in the figure almost reach at the same time without any delay phenomenon. Here, reaching at the same time is not a limitation, which means slight time differences that the respective sub-carriers reach will not cause decoding problem to the system.

For the technology of pre-compensating for a group delay phenomenon caused by optical fiber chromatic dispersion provided in the embodiments of the present invention, the pre-compensation values is set as long as the system is constructed. Subsequently, as the optical fiber chromatic dispersion is in the same optical fiber communication system, the chromatic dispersion has small variability unless hardware is changed or the optical fiber path is replaced. That is to say, the manner of the pre-compensation is quite applicable to the optical-OFDM system.

In Example 1, for example, the same frequency band and pitch are set between the respective sub-carriers. If the frequency bands and pitches are different, the present invention may also be used, as long as delay times required by the respective sub-carriers are adjusted respectively.

Detailed structure of the time domain modulated waveform generators 140, 141 may be obtained with reference to FIG. 4. As can be seen from the figure, each time domain modulated waveform generator 140, 141 comprises a look up table for real part 42a, a look up table for imaginary part 142b, and a multiplexer group 149. The look up table for real part 142a has a plurality of real part basic waveforms. The look up table for imaginary part 142b has a plurality of phase values. The multiplexer group 149 queries the time domain signal 143, 144 in the look up table for real part 142a and the look up table for imaginary part 142b according to the parallel signal 91 corresponding to the time domain modulated waveform generator 140, 141.

The look up table for real part 142a stores a plurality of basic waveforms, while the look up table for imaginary part 142b stores a plurality of phases. Each parallel signal 91 has a real part 910 and an imaginary part 912. The multiplexer group 149 queries a corresponding basic waveform and a phase in the look up table for real part 142a and the look up table for imaginary part 142b corresponding to the parallel signal 91 according to the real part 910 and imaginary part 912 of the parallel signal 91.

In FIG. 4, a quadrature PSK (QPSK) is taking as an example for the time domain modulated waveform generators 140, 141. The QPSK signal comprises four types: (0,0), (0,1), (1,1) and (1,0). That is to say, the first number in the brackets is the real part 910 of the parallel signal 91 (usually represented by I), and the second number is the imaginary part 912 of the parallel signal 91 (usually represented by Q). The multiplexer group 149 receives the real part 910 and the imaginary part 912 of the parallel signal 91, and selects the corresponding look up table 142a, 142b according to the received part. The multiplexer group 149 queries a corresponding basic waveform in the look up table for real part 142a according to the real part 910 of the parallel signal 91. The multiplexer group 149 queries a corresponding phase value in the look up table for imaginary part 142b according to the imaginary part 912 of the parallel signal 91. Next, the multiplexer group 149 outputs the time domain signal according to the queried basic waveform and phase value.

The multiplexer group 149 has a first multiplexer 147a, a second multiplexer 147b, and a phase inverter 147c. The first multiplexer 147a receives the real part 910 of the parallel signal 91, so as to select to output from the look up table for real part or the look up table for imaginary part. If the value of the real part 910 of the parallel signal 91 is 1, the output is from the look up table for imaginary part 142b. On the contrary, if the value of the real part 910 of the parallel signal 91 is 0, the output is from the look up table for real part 142a. Next, the output of the first multiplexer 147a is divided into two signals. One of the two signals is connected to an input end representing "0" of the second multiplexer 147b through the phase inverter 147c. The other signal is directly connected to an input end representing "1" of the second multiplexer 147b.

In the embodiment, the phase inverter 147c is used as an element for phase conversion. However, if this embodiment is applied in an 16 QAM system, the phase inverter 147c needs to be changed to a phase converter or a signal amplifier, and other circuits are modified correspondingly.

The second multiplexer 147b receives the imaginary part 912 of the parallel signal 91, so as to select one of the two signals divided by the first multiplexer 147a as the output of the second multiplexer 147b. If the value of the imaginary part 912 of the parallel signal 91 is 1, the output of the first multiplexer 147a becomes the output of the second multiplexer 147b directly. On the contrary, if the value of the imaginary part 912 of the parallel signal 91 is 0, the output of the second multiplexer 147b is the output signal of the phase inverter 147c. In such a manner, the time domain modulated waveform generators 140, 141 may suitably convert the parallel signals 91 into basic waveforms having phases according to its real part 910 and imaginary part 912.

The basic waveforms having phases are output to the delay units 145, 146. As discussed above, the delay units 145, 146 are set with pre-compensation values respectively. A pre-compensation value corresponds to one of the delay units 145, 146. Taking a digital delay unit as an example, the point number is used as a calculation unit for the setting of the pre-compensation values. That is to say, the setting is performed in a manner of delaying N sampling points. The delay units 145, 146 may comprise a plurality of shift registers (for example, shift registers with a length N) and a controller. When the delay units 145, 146 need to be delayed for a point number, the controller is set, such that when the delay units 145, 146 are triggered once, signals input to the delay units 145, 146 are moved into a shift register, and are moved out again when the delay units 145, 146 are trigger again. In a similar way, if two points need to be delayed, the controller is set, such that after the signals input into the delay units 145, 146 pass two shift registers, the signals are moved out again, thereby achieving a purpose of delaying for two points.

Therefore, the basic waveforms having phases are output to the delay units 145, 146. The delay units 145, 146 delay the corresponding "basic waveforms with phases" according to the set pre-compensation values and output the delayed basic waveforms. The adder 148 merges signals output from the delay units 145, 146 into the merged signal 92.

The QPSK is taken as an example for the time domain modulated waveform generators 140, 141, but the present invention is not limited thereto. If the signal to be converted by the time domain modulated waveform generator is the QAM, the multiplexer group 149 comprises an element for amplitude amplification, and selection is made. That is to say, the time domain modulated waveform generators 140, 141 may select corresponding basic waveform, phase and amplitude according to the parallel signal 91.

All the correspondence relations between the time domain modulated waveform generators 140, 141, the multiplexer group 149, the parallel signals 91, the pre-compensation values and the sub-carriers are all one-to-one relations. That is to say, each sub-carrier corresponds to one parallel signal 91, one multiplexer group 149, one pre-compensation value, and one time domain modulated waveform generator 140. The look up table for real part 142a and the look up table for imaginary part 142b of each time domain modulated waveform generator 140 correspond to the real part 910 and the imaginary part 912 of the parallel signal 91 correspondingly.

Referring to FIG. 3, the receiver 60 comprises an optical sensor 62, an analog to digital converter 64, a synchronizer 66, a fast Fourier transferring element 68, and a dispersion monitor and equalizer QAM demodulator 69.

The optical sensor 62 receives the optical signal 94 and converts it into an analog electric signal 95. Thus the analog electric signal 95 is converted into a first digital signal 96 through the analog to digital converter 64. Next, the synchronizer 66 estimates a symbol boundary of the first digital signal 96 and removes the guard interval of the first digital signal 96 to form a second digital signal 97. The fast Fourier transferring element 68 performs the fast Fourier transfer on the second digital signal 97 to form a parallel third digital signal 98 in the frequency domain. The dispersion monitor and equalizer QAM demodulator 69 estimates whether chromatic dispersion delays still exist between respective sub-carriers in the third digital signal 98 or not. If the chromatic dispersion delays still exist, the third digital signal 98 is returned to the transmitter 10 through the control channel 84 as in the drawings for compensation. Next, the dispersion monitor and equalizer QAM demodulator 69 decodes the third digital signal 98 according to frequency bands of respective sub-carriers and transmits a decoded signal 99. In such a manner, the data transmitted by the transmitter 10 may be successfully decoded.

Figure 6:
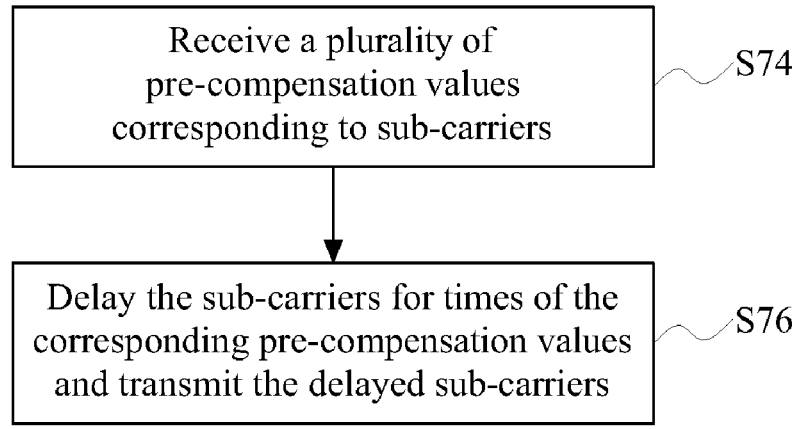
FIG. 6 is a schematic flow chart of a pre-compensation method for delays caused by optical fiber chromatic dispersion according to an embodiment of the present invention.

Moreover, FIG. 6 is a schematic flow chart of a pre-compensation method for delays caused by optical fiber chromatic dispersion according to an embodiment of the present invention. The pre-compensation method is applicable to an OFDM transmitter. The transmitter transmits an optical signal having a plurality of sub-carriers. Each sub-carrier has a carrier frequency, and the carrier frequencies of the sub-carriers are different. This pre-compensation method comprises the following steps.

In Step S74, a plurality of pre-compensation values is received. The pre-compensation values correspond to the sub-carriers.

In Step S76, the sub-carriers are delayed for times of the corresponding pre-compensation values and then transmitted.

The pre-compensation method is performed by an optical-OFDM transmitter 10. The carrier frequencies of the sub-carriers are frequency bands used by the respective sub-carriers, such as M*df or (M+1)*df in FIG. 2A. The carrier frequencies used by respective sub-carriers are different.

The pre-compensation values in Step S74 may be delay times corresponding to the respective sub-carriers returned through the control channel 84 from the receiver 60 in real time. The pre-compensation values may also be set on the transmitter 10 manually after the receiver 60 is queried. The transmitter 10 may execute the method upon receiving the pre-compensation values.

In Step S76, the respective sub-carriers are delayed for their corresponding pre-compensation values (the delay times thereof are compensated for) in the manner as shown in FIG. 5A. Therefore, the signals as in FIG. 5B may be received at the receiver 60.

Figure 7:
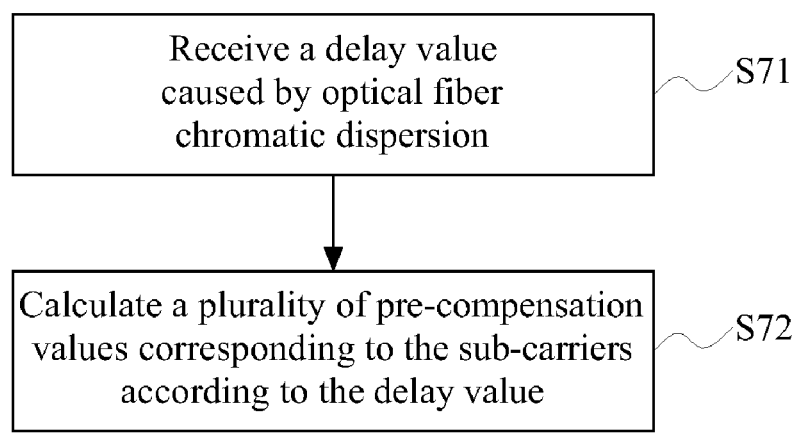
FIG. 7 is a schematic flow chart of a method prior to the pre-compensation method according to the embodiment of the present invention in FIG. 6.

Referring to FIG. 7, before Step S74, the pre-compensation method according to the embodiment of the present invention further comprises the following steps.

In Step S71, a delay value caused by optical fiber chromatic dispersion is received.

In Step S72, a plurality of pre-compensation values corresponding to the sub-carriers is calculated according to the delay value.

In consideration of that a total delay time caused by the optical fiber chromatic dispersion (that is to say, a total delay time between a sub-carrier with the highest frequency and a sub-carrier with the lowest frequency, instead of the delay times received by the respective sub-carriers) may be returned by the receiver 60, these two steps are added. Therefore, the transmitter 10 needs to perform the above steps, and converts the total delay time into the pre-compensation values corresponding to the sub-carriers respectively.

In Step S71, after a delay value returned by the receiver 60 or a delay value manually input is received, the delay value is converted into the pre-compensation values corresponding to the respective sub-carriers in Step S72. The delay value is a total delay time between a sub-carrier reached latest and a sub-carrier reached earliest.

Figure 8:
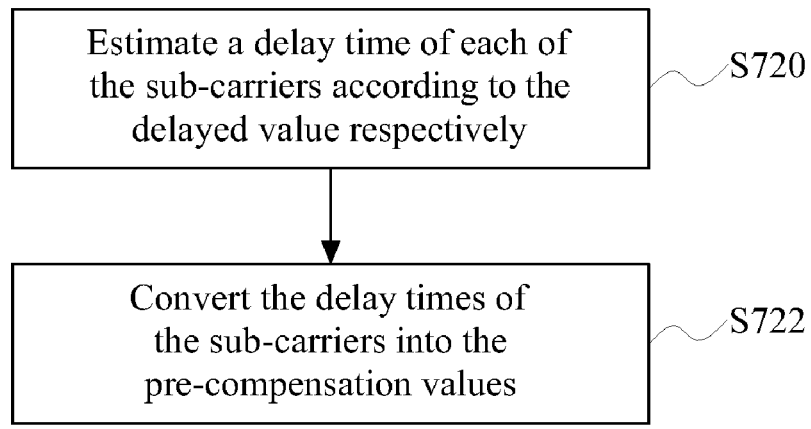
FIG. 8 is a schematic flow chart of a method of Step S72 according to an embodiment of the present invention.

Referring to FIG. 8, Step S72 further comprises Step S720 and Step S722. In Step S720, delay times of the sub-carriers are estimated respectively according to the delay value. In Step S722, the delay times of the sub-carriers are converted into the pre-compensation values.

For the estimation in Step S720, if the Example 1 is taken as an example, the delay value received by the transmitter 10 is 700 ps. As frequency intervals between respective sub-carriers (or referred to as a frequency band width, or a carrier frequency distance) are the same, the delay times of the sub-carriers are estimated respectively according to the delay value, that is, the delay value is divided by a number of sub-carrier intervals. For Example 1, 700 ps is divided by (8−1) to obtain 100 ps. Next, a sub-carrier with the lowest frequency (first sub-carrier) reaches earliest, such that a delay time of the sub-carrier with the lowest frequency is 0 ps. A delay time of each sub-carrier is calculated in arithmetical series sequentially (frequencies from low to high). The delay times of the second to the eighth sub-carriers are 100, 200, 300, 400, 500, 600, 700 ps, respectively.

Figure 9:
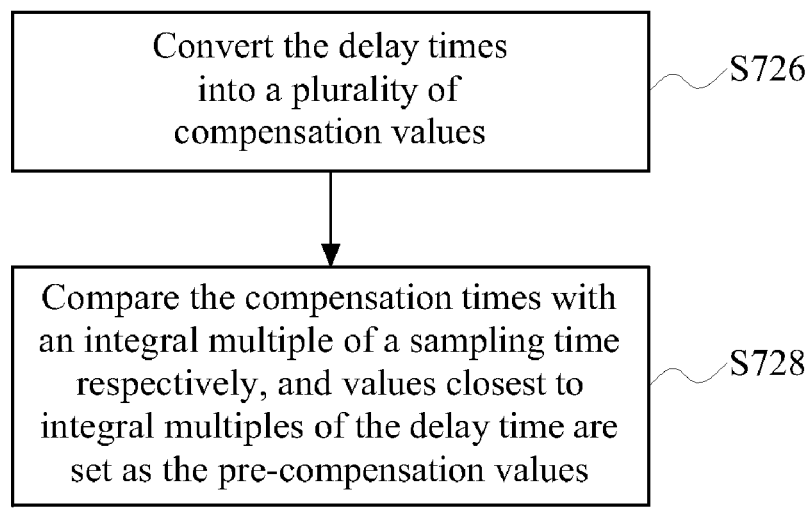
FIG. 9 is a schematic flow chart of a method of Step S722 according to an embodiment of the present invention.

Next, in Step S722, the delay times of the sub-carriers are converted into the pre-compensation values. Referring to FIG. 9, Step S722 comprises Step S726 and S728. In Step S726, the delay times are converted into a plurality of compensation times. In Step S728, the compensation times are compared to an integral multiple of a sampling time respectively, and values closest to the integral multiples of the delay times are set as the pre-compensation values.

In Step S726, the delay times are converted into compensation times (that is, transmission time needs to be delayed). In the present invention, the sub-carrier with the highest frequency is transmitted first. Thus, as for Example 1, the eighth sub-carrier does not need to be delayed, and the first sub-carrier needs to be delayed 700 ps. That is to say, the compensation time needed for each sub-carrier is obtained by subtracting each delay time from the total delay time (700 ps). Therefore, from the first sub-carrier to the seventh sub-carrier, the respective compensation times are 700, 600, 500, 400, 300, 200, 100 ps.

Next, in consideration of that this is a digital delay, which needs to be synchronized with the sampling time, and thus Step S728 needs to be performed, such that the compensation times are consistent with multiples of the sampling time, that is, values of integral multiples closest to the delay time are set as the pre-compensation values. Taking the seventh sub-carrier as an example, the compensation time thereof is 100 ps, which is not an integral multiple of the sampling time. Thus, 80 ps or 120 ps may be used. For the example in the table, 120 ps is used.

Through the method, delays caused by chromatic dispersion may be pre-compensated for effectively at the transmitter 10. Thus, after the optical signal 94 is transmitted through the optical fiber 80, the sub-carriers received at the receiver 60 are nearly synchronous, and necessity for estimation by the receiver 60 is reduced.

In the end, in addition to the Example 1, Example 2 is provided below to illustrate improvement in effect of the present invention in comparison with conventional technologies. Chromatic dispersion constant of an optical fiber used in Example 2 is 17 ps/nm/km (that is, a chromatic dispersion delay of 17 ps will be generated for transmission per nanometer wavelength per kilometer length). The bandwidth used is 25 GHz, the sampling rate is 25 GHz, and the point number (size) of fast Fourier conversion is 128 points. The transmission distance is 1000 kilometers (km). In the test condition, when a conventional method is used, as 1 nm wavelength difference nearly equals to 125 GHz frequency difference, 25 GHz nearly equals to 0.2 nm (that is, 25/125). After the transmission for 1000 km, a group delay time of the highest and lowest frequencies is 3400 ps (17 ps/nm/km×1000 km×0.2 nm=3400 ps). 25 GHz sampling rate is 40 ps/point. Its guard interval needs 85 sampling points (3400 ps/40 ps=85 points). This increases a time length of every symbol from original 128 points to 213 points (85+128). In such a manner, total transmission bandwidth occupied by the guard interval (may also be referred to as overhead here) is 85/(85+128)= 40%. That is to say, 10 GHz in the 25 GHz bandwidth is used for transmitting the guard interval (for example, cyclic prefix). For application in a 100 Gps ($10^9$ bit/second) Ethernet link in the future, 40 Gps is used for transmitting repetitive guard intervals.

On the contrary, the method according to the embodiment of the present invention is used in Example 2. It can be seen from the calculation illustration from the table above, the guard interval only needs one point number to solve the group delay's variation problem. If a conservative manner is adopted, the guard interval is set as two points, such that the guard interval only occupies about 1.5% (2/(2+128)=1.5%) in the total bandwidth. Compared with the conventional technology, much bandwidth is saved.

Figure 10A:
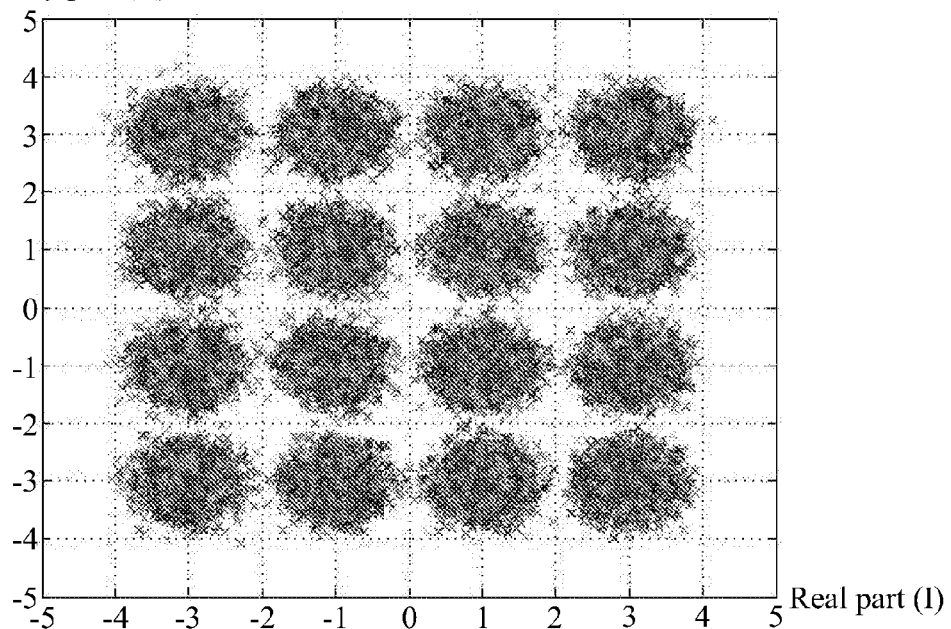
FIGS. 10A and 10B are schematic views of signals at a receiving end with and without using an embodiment of the present invention, respectively.
Figure 10B:
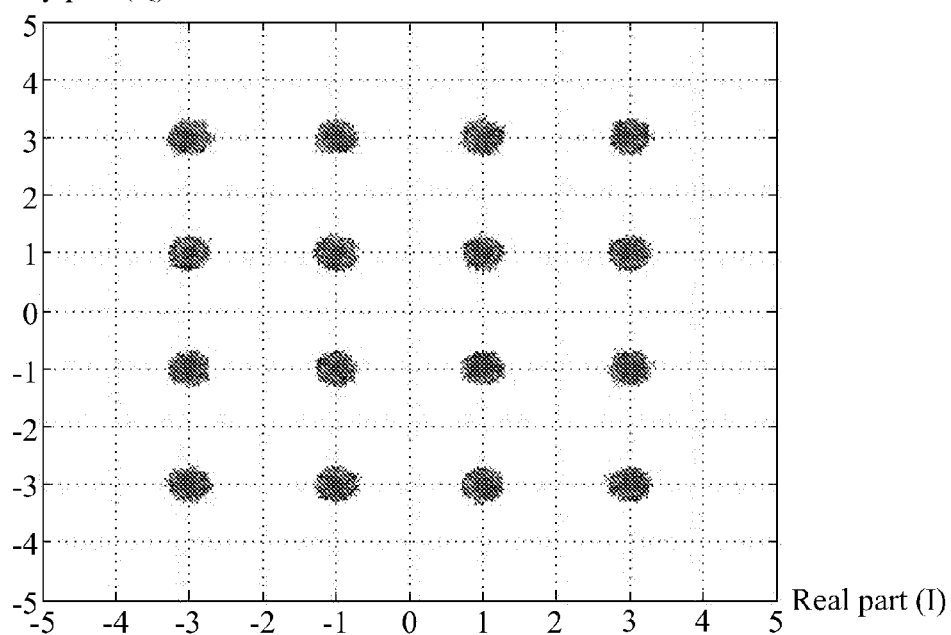

Next, FIGS. 10A and 10B are schematic views of signals at the receiving end with or without using the method of the present invention, respectively. Both of the test bandwidths are 10 GHz (10×$10^9$ Hz). The test distance is 1000 kilometers single mode fiber transmission. The two figures are both constellation graphs of 16 QAM received by the receiver 60. The horizontal axis is the real part (I, which may also be referred to as sine), and the vertical axis is the imaginary part (Q, which may also be referred to as cosine). FIG. 10A is the constellation graph without using the pre-compensation method of the present invention. FIG. 10B is the constellation graph using the pre-compensation method of the present invention. As can be seen from FIG. 10A, each point area in the constellation graph for the receiving end 60 is quite divergent (dispersed). This causes a great increase of the error rate after decoding. On the contrary, in FIG. 10B, the embodiment of the present invention is used, and every point area is quite converged. The improvement in effect of the present invention compared with the conventional technology is apparent.

Figure 11:
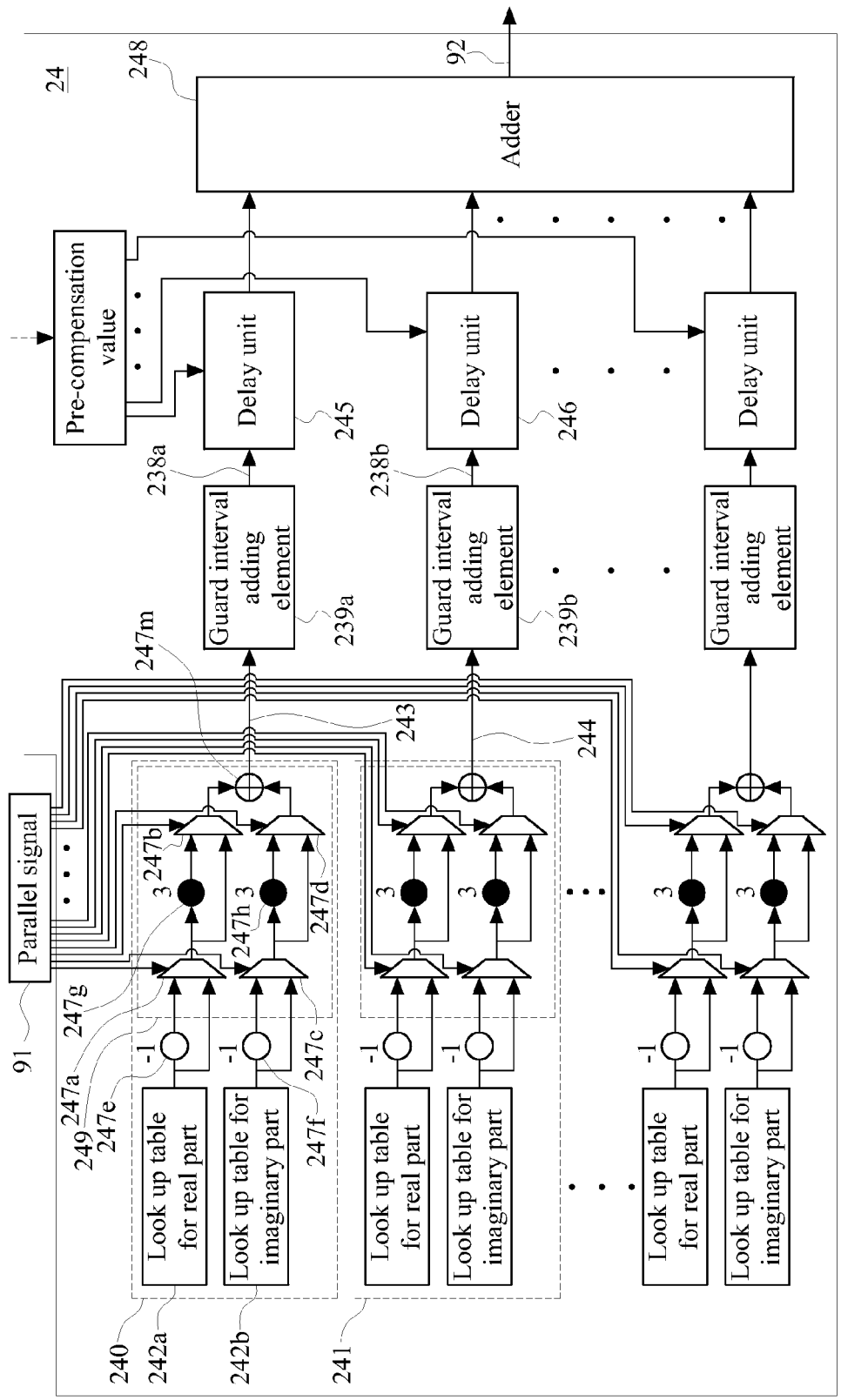
FIG. 11 is a schematic circuit block diagram of a multi-sub-carrier signal generator in a transmitter of an optical-OFDM system according to another embodiment of the present invention.

FIG. 11 is a schematic circuit block diagram of the multi-sub-carrier signal generator in the transmitter of the optical-orthogonal frequency-division multiplexing (OFDM) system according to another embodiment of the present invention. The multi-sub-carrier signal generator 24 is adapted to generate time domain signals 243, 244 for 16 QAM.

The multi-sub-carrier signal generator 24 in FIG. 11 generates a plurality of time domain signals 243, 244 corresponding to respective sub-carriers respectively according to the parallel signals 91, and the multi-sub-carrier signal generator 24 further delays the time domain signal 243, 244 and merges the delayed time domain signals 243, 244 into a merged signal 92 according to a plurality of pre-compensation values corresponding to the parallel signals 91.

The multi-sub-carrier signal generator 24 comprises a plurality of time domain modulated waveform generators 240, 241, a plurality of guard interval adding elements 239*a*, 239*b*, a plurality of delay units 245, 246, and a first adder 248. The time domain modulated waveform generators 240, 241 correspond to the parallel signals 91 in a one-to-one relation. The time domain modulated waveform generators 240, 241 convert the parallel signals 91 in the frequency domain into the time domain signals 243, 244 in the time domain. Subsequently, the guard interval adding elements 239*a*, 239*b* correspond to the time domain modulated waveform generators 240, 241 and the delay units 245, 246 in a one-to-one relation. The guard interval adding units 239*a*, 239*b* add guard intervals to the time domain signals 243, 244 to form GI-added signals 238*a*, 238*b*. Each of the delay units 245, 246 transmits the GI-added signals 238*a*, 238*b* generated by its corresponding guard interval adding units 239*a*, 239*b* after delaying the GI-added signals 238*a*, 238*b* for the predetermined delay value. In such a manner, although every all signals 91 are received by the multi-sub-carrier signal generator 24 at the same time, after the adjustment of the multi-sub-carrier signal generators 24, the delay units 245, 246 delay the time domain signals 243, 244 for a time of a corresponding predetermined delay value and transmit the delayed time domain signals 243, 244. The first adder 248 merges the GI-added signals 243, 244 transmitted by the delay units 245, 246 and outputs the merged signal 92.

The time domain modulated waveform generators 240, 241 comprise a look up table for real part 242*a*, a look up table for imaginary part 242*b*, and a multiplexer group 249. The multiplexer group 249 queries and converts the time domain signals 243, 244 in the look up table for real part 242*a* and the look up table for imaginary part 242*b* according to the parallel signals 91 corresponding to the time domain modulated waveform generators 240, 241.

The multiplexer group 249 comprises a first multiplexer 247*a*, a second multiplexer 247*b*, a third multiplexer 247*c*, a fourth multiplexer 247*d*, two phase inverters 247*e*, 247*f*, two signal amplifiers 247*g*, 247*h*, and a second adder 247*m*. The signal amplifiers 247*g*, 247*h* amplify the received signals. For this embodiment, the signal amplifiers 247*g*, 247*h* amplify the received signals for three times and output the amplified signals.

The first multiplexer 247*a* and the second multiplexer 247*b* corresponding to the look up table for real part 242*a* incorporate the phase inverter 247*e* and the signal amplifier 247*g*, and query the output signals corresponding to the parallel signals 91 from the look up table for real part 242*a* according to the parallel signals 91. The output signals may be formed through the phase inverter 247*e* and the signal amplifier 247*g* after they are queried from the look up table for real part 242*a*. Alternatively, it is also possible that the output signals do not pass the phase inverter 247*e* and the signal amplifier 247*g*, depending on the signals that the parallel signals 91 output to the first multiplexer 247*a* and the second multiplexer 247*b*. Similarly, the third multiplexer 247*c* and the fourth multiplexer 247*d* corresponding to the look up table for imaginary part 242*b* incorporate the phase inverter 247*f* and the signal amplifier 247*h*, and query the output signals corresponding to the parallel signals 91 from the look up table for imaginary part 242*b* according to the parallel signals 91.

The second adder 247*m* merges the output signals from the second multiplexer 247*b* and the fourth multiplexer 247*d* (similar to an addition action) to form the time domain signal 243.

Through the multi-sub-carrier signal generator 24 in FIG. 11, parallel signals 91 in the frequency domain are converted into time domain signals 243, 244 of 16 QAM.

What is claimed is:

1. A pre-compensation method for delays caused by optical fiber chromatic dispersion, applicable to an optical-orthogonal frequency-division multiplexing (OFDM) transmitter, wherein the transmitter transmits an optical signal having a plurality of sub-carriers, each sub-carrier has a carrier frequency, and the carrier frequencies of the sub-carriers are different, the method comprising:

receiving a delay value caused by optical fiber chromatic dispersion;

calculating a plurality of pre-compensation values corresponding to the sub-carriers according to the delay value, comprising:

estimating a delay time of each sub-carrier according to the delay value respectively; and converting the delay time of the sub-carriers into the pre-compensation values;

receiving the plurality of pre-compensation values corresponding to the sub-carriers; and delaying the sub-carriers for times of the corresponding pre-compensation values and transmitting the delayed sub-carriers.

2. The pre-compensation method for delays caused by optical fiber chromatic dispersion according to claim 1, wherein the step of converting the delay time of the sub-carriers into the pre-compensation values comprises:

converting the delay time into a plurality of compensation times; and comparing the compensation times with an integral multiple of a sampling time respectively, setting the integral multiples of the sampling time closest to the compensation times as the pre-compensation values.

3. The pre-compensation method for delays caused by optical fiber chromatic dispersion according to claim 2, wherein the pre-compensation values of the sub-carriers having the higher carrier frequencies are less than the pre-compensation values of the sub-carriers having the lower carrier frequencies.

4. A multi-sub-carrier signal generator, applicable to a transmitter of an optical-orthogonal frequency-division multiplexing (OFDM) system, wherein a serial to parallel converter of the transmitter converts and map a digital sequence signal into a plurality of parallel signals, and each of the parallel signals comprises a real part and an imaginary part, the generator comprising:

a plurality of time domain modulated waveform generators, corresponding to the parallel signals in a one-to-one relation, wherein each of the time domain modulated waveform generators generates a time domain signal according to the corresponding parallel signal, wherein each of the time domain modulated waveform generators comprises:

a look up table for real part, having a plurality of real part basic waveforms;

a look up table for imaginary part, having a plurality of phase values; and a multiplexer group, adapted to query the time domain signal in the look up table for real part and the look up table for imaginary part according to the parallel signal corresponding to the time domain modulated waveform generator;

a plurality of guard interval adding elements, corresponding to the time domain modulated waveform generators in a one-to-one relation, wherein each of the guard interval adding elements adds a guard interval to the time domain signal generated by the corresponding time domain modulated waveform generator respectively to form an GI-added signal;

a plurality of delay units, corresponding to the guard interval adding elements in a one-to-one relation, wherein each of the delay units has a predetermined delay value, and each of the delay units transmits the GI-added signal generated by the corresponding guard interval adding element after delaying the GI-added signal for the predetermined delay value; and an adder, adapted merge the GI-added signals transmitted by the delay units and output a merged signal.

5. The multi-sub-carrier signal generator according to claim 4, wherein the multiplexer group queries a corresponding basic waveform in the look up table for real part according to the real part of the parallel signal, the multiplexer group queries a corresponding phase value in the look up table for imaginary part according to the imaginary part of the parallel signal, and the multiplexer group outputs the time domain signal according to the queried basic waveform and phase value.

6. A transmitter for an optical-orthogonal frequency-division multiplexing (OFDM) system, adapted to convert a digital sequence signal into an optical signal and transmit the optical signal, comprising:

a serial to parallel converter, adapted to convert and map the digital sequence signal into a plurality of parallel signals;

a multi-sub-carrier signal generator, adapted to generate a plurality of corresponding time domain signals according to the parallel signals, and to further delay the time domain signals according to a plurality of predetermined delay values corresponding to the parallel signals and merge the delayed time domain signals into a merged signal, wherein the multi-sub-carrier signal generator comprises:

a plurality of time domain modulated waveform generators, corresponding to the parallel signals in a one-to-one relation, wherein each of the time domain modulated waveform generators generates the time domain signal according to the corresponding parallel signal, wherein each of the time domain modulated waveform generators comprises:

a look up table for real part, having a plurality of real part basic waveforms;

a look up table for imaginary part, having a plurality of phase values; and a multiplexer group, adapted to query the time domain signal in the look up table for real part and the look up table for imaginary part according to the parallel signal corresponding to the time domain modulated waveform generator;

a plurality of delay units, corresponding to the time domain modulated waveform generators in a one-to-one relation, wherein each of the delay units transmits the time domain signal generated by the corresponding time domain modulated waveform generator after delaying the time domain signal for the predetermined delay value; and an adder, adapted to merge the time domain signals transmitted by the delay units and output the merged signal;

a digital to analog converter, adapted to convert the merged signal into an analog signal; and an electrical to optical converter, adapted to convert the analog signal into the optical signal.

7. The transmitter according to claim 6, wherein the electrical to optical converter is a laser.

8. The transmitter according to claim 6, wherein each of the parallel signals comprises a real part and an imaginary part, the multiplexer group queries a corresponding basic waveform in the look up table for real part according to the real part of the parallel signal, the multiplexer group queries a corresponding phase value in the look up table for imaginary part according to the imaginary part of the parallel signal, and the multiplexer group outputs the time domain signal according to the queried basic waveform and phase value.

* * * * *